United States Patent [19]

Senda et al.

[11] Patent Number: 4,540,718

[45] Date of Patent: Sep. 10, 1985

[54] PRE-EXPANDED PARTICLE OF POLYOLEFINE AND PROCESS FOR PREPARING THE SAME

[75] Inventors: Kenichi Senda, Hirakata; Masao Ando, Toyonaka; Kyoichi Nakamura, Settsu; Tatehiko Nishida, Ibaraki, all of Japan

[73] Assignee: Kanegafuchi Kagaku Kogyo Kabushiki Kaisha, Osaka, Japan

[21] Appl. No.: 584,859

[22] Filed: Feb. 29, 1984

[30] Foreign Application Priority Data

Apr. 5, 1983 [JP] Japan .................................. 58-60591
Jan. 18, 1984 [JP] Japan .................................... 59-7634

[51] Int. Cl.$^3$ ............................................. C08J 9/18
[52] U.S. Cl. ................................ 521/58; 264/DIG. 9; 521/56; 521/60; 521/142
[58] Field of Search ..................................... 521/56, 60

[56] References Cited

U.S. PATENT DOCUMENTS

| | | | |
|---|---|---|---|
| 4,168,353 | 9/1979 | Kitamori | 521/60 |
| 4,275,023 | 6/1981 | Shimizu et al. | 521/60 |
| 4,303,756 | 12/1981 | Kajimura et al. | 521/60 |
| 4,366,263 | 12/1982 | Sato et al. | 521/60 |
| 4,399,087 | 8/1983 | Akiyama et al. | 521/60 |
| 4,415,680 | 11/1983 | Ushirokawa et al. | 521/60 |
| 4,436,840 | 3/1984 | Akiyama et al. | 521/60 |

*Primary Examiner*—Morton Foelak
*Attorney, Agent, or Firm*—Armstrong, Nikaido, Marmelstein & Kubovcik

[57] ABSTRACT

A pre-expanded particle suitable for foaming in a mold comprising polyolefin which has a characteristic property that an inclination of slope line obtained on a graph when logarithmic values of melt tension of the polyolefin are plotted as ordinate and reciprocals of absolute temperature at which the melt tension is measured are plotted as abscissa is less than 1,500 is provided. A foamed article produced from the pre-expanded particles has an excellent appearance, a flat surface and good mechanical strength, and is useful for wrapping material, insulating material, a container or a fender of cars.

A process for preparing the above-mentioned pre-expanded particles is also disclosed.

3 Claims, 1 Drawing Figure

PRE-EXPANDED PARTICLE OF POLYOLEFINE AND PROCESS FOR PREPARING THE SAME

BACKGROUND OF THE INVENTION

The present invention relates to a pre-expanded particle of polyolefin suitable for foaming within a mold which is able to close but unable to seal by heating with a heating medium such as steam and a process for preparing the same.

Hitherto, there have been proposed various pre-expanded particles of polyolefin for foaming within a mold. However, in case of molding in industrial scale using a large size, multi-cavity mold, these pre-expanded particles, especially non-crosslinked pre-expanded particles have a number of drawbacks that the particles are not well fused together, that a surface of a molded article is not flat and that appearance of a molded article is not good, and thus, an adequate molded article, as a matter of fact, cannot be obtained.

With respect to a process for preparing pre-expanded particles of polyolefin for foaming within a mold, a process including a step of heating the polyolefin particles containing a volatile foaming agent with, for example, steam is generally carried out. However, when the polyolefin particles are polyethylene particles, it is necessary to employ crosslinked polyethylene resin because if polyethylene is not crosslinked, a melt viscosity of the polyethylene resin is remarkably fell down at a temperature about a melting point thereof and it is very difficult to obtain pre-expanded particles which are less shrinked and have a high pre-expansion ratio. For preparing the crosslinked polyethylene resin, high-pressure process, low density polyethylene is widely used as a starting material because the high-pressure process, low density polyethylene can be easily and well crosslinked. A pre-expanded particle obtained from the high-pressure process, low density polyethylene is superior in pliability and bufferability or cushoning property. However, the pre-expanded particle is inferior in heat-resistance and wants for solidity. Therefore, there can be used only the pre-expanded particle which has a relatively low pre-expansion ratio. Further, from the viewpoint of an industrial production, it is required to produce foamed articles constantly in a high yield which have an excellent appearance, a high expansion ratio and good mechanical properties by foaming process employing pre-expanded particles of polyolefin.

The present inventors have studied in order to eliminate the above-mentioned drawbacks which are distinguished when the pre-expanded particles, especially pre-expanded particles of non-crosslinked polymer are employed for foaming within a mold, and we have reached the following knowledge; that is, in case of industrially producing a large size of foamed article, the characteristic properties such as appearance and mechanical strength of the obtained foamed article have a great relation to the characteristic properties such as viscoelasticity of polyolefin when melted, which is a fundamental component of pre-expanded particles of polyolefin used for foaming within a mold, and especially polyolefin having a small change of melt tension due to temperature variation is necessary particularly for producing a large size of foamed article of excellent appearance and good mechanical strength.

Consequently, by minimizing the change of melt tension due to temperature variation, even if there is partially generated a difference in temperature among the locations of the pre-expanded particles filled in a mold when the mold charged with the pre-expanded particles is heated, a molded article which is uniform on the whole having excellent properties can be obtained.

That means polyolefin employed as fundamental component in a preparation of the pre-expanded particles must have the same characteristic properties as described above.

The difference in temperature among the locations of the pre-expanded particles in a mold which generates during heating, as a matter of course, becomes large when a large size of foamed article is molded.

It is an object of the present invention to provide a pre-expanded particle suitable for foaming within a mold to produce a molded article having a higher expansion ratio, and to provide a pre-expanded particle prepared from non-crosslinked polymer without reducing a pliability and a bufferability or a cushoning property which are the characteristic properties of the conventional pre-expanded particles employing high-pressure process low density crosslinked polyethylene, particularly worthwhile when applied in molding a large size foamed article.

It is an another object of the present invention to provide a process for preparing such particles.

These and other objects of the present invention will become apparent from the description hereinafter.

SUMMARY OF THE INVENTION

In accordance with the present invention, there is provided a pre-expanded particle of polyolefin having a characteristic property that an inclination of melt tension is less than 1,500.

In accordance with the present invention, there is also provided a process for preparing pre-expanded particles of polyolefin which comprises: dispersing polyolefin particles and a volatile foaming agent into water in the presence of a dispersing agent in an autoclave, heating the resulting dispersion with stirring up to a temperature in a following range:
(a melting point of the polyolefin −25)° C.
to (a melting point of the polyolefin +10)° C.,
thereby the polyolefin particles are impregnated with the foaming agent and then, releasing the dispersion of the polyolefin particles into an atmosphere having a pressure lower than that in the autoclave; the polyolefin having a characteristic property that an inclination of melt tension is less than 1,500.

A pre-expanded particle of the present invention has a high pre-expansion ratio and is superior in heat-resistance, mechanical strength, pliability and cushoning property, and can be employed for foaming within a mold to give a good foamed article.

DETAILED DESCRIPTION

Figure 1:
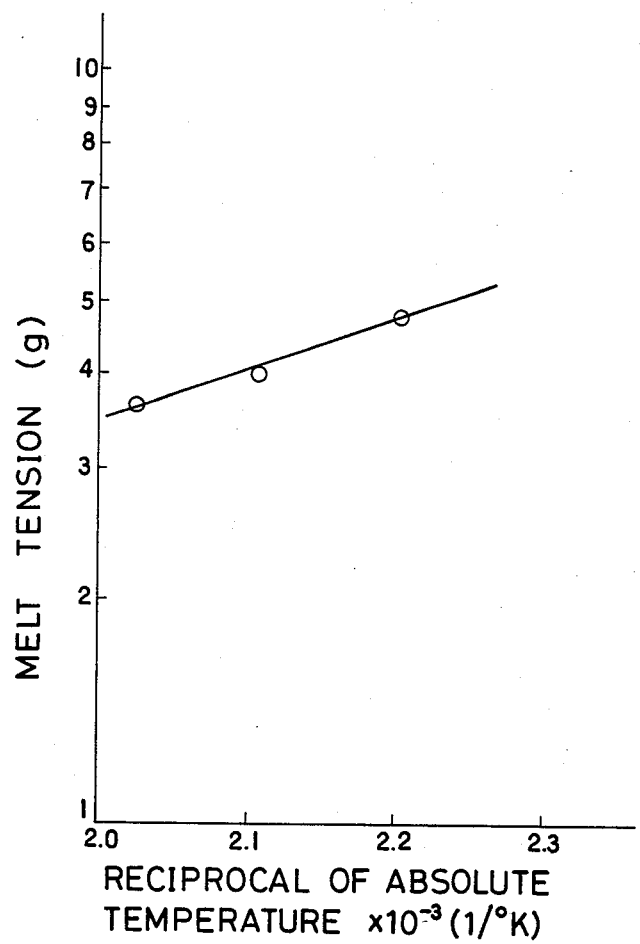
FIG. 1 is a graph showing a relationship between melt tension of non-crosslinked linear low density polyethylene used in Example 1 and absolute temperature.

According to the present invention, various kinds of polyolefins, whether they are crosslinked or not, can be employed. Examples of the polyolefin are, for instance, low density polyethylene, medium density polyethylene, high density polyethylene, linear low density polyethylene, polypropylene, ethylene-propylene copolymer, ethylene-butene-propylene terpolymer, ethylenevinyl acetate copolymer, poly(butene-1) and the like. Particularly, low density polyethylene, medium density polyethylene, linear low density polyethylene and ethylene-propylene random copolymer are preferably employed. Although in the present invention, non-crosslinked polyolefin is preferably used from an economical viewpoint and practically usable for producing an excellent foamed article, crosslinked polyolefin can also be employed.

The polyolefin employed in the present invention has a characteristic property that an inclination of slope line obtained on a graph when logarithmic values of melt tension of the polyolefin are plotted as ordinate and reciprocals of absolute temperature at which the melt tension is measured are plotted as abscissa is less than 1,500. Hereinafter, the above-defined inclination is referred to as "an inclination of melt tension", and a meaning of the term of an inclination of melt tension described in Claims are defined as same as above.

According to the descriptions in "Kobunshi Kako Kogaku" (Japanese translation of "Polymer Processing", by James M. McKelvey, published by JOHN WILEY & SONS, INC., New York, London, 1962), translated by Katsuhiko Itoh, published by Maruzen Kabushiki Kaisha, p37, Arrhenius stated that a relationship between log $\mu$, wherein $\mu$ is a viscosity of the polymer, and reciprocal of absolute temperature is proportional in a range of 100 degree Fahrenheit.

An inclination of melt tension is, preferably less than 1,000, more preferably less than 700. When an inclination of melt tension is not less than 1,500, it is difficult to control a pre-expansion ratio and cell size during a preparation of pre-expanded particles. In that case, even if pre-expanded particles of desired expansion ratio and cell size are obtained, the resulting foamed article is inferior in appearance and mechanical strength because in general the pre-expanded particles are not heated uniformly during foaming within a mold and they are partly shrinked or varied in shape due to overheating, or are not sufficiently expanded or fused together due to underheating.

A reason why the pre-expanded particles are not uniformly heated during foaming within a mold consists in a fundamental structure of the used foaming apparatus and this drawback cannot be eliminated substantially.

A foaming apparatus has a structure in which steam passes through the packed pre-expanded particles in a mold to obtain a foamed article and the steam flow more and more hardly according as the pre-expanded particles are expanded and fused together so as to be molded. The foaming apparatus has also a mechanism that when a pressure within a mold finally reaches to a pre-determined pressure, steam flow is shut. In case of employing a foaming apparatus for producing a larger size of foamed article, the pre-expanded particles packed in a mold are heated more uniformly.

Melt tension of the polyolefin is roughly decided at the time of preparing the polyolefin. The polyolefin having a low melt tension can be prepared by a number of processes such as that polymerization reaction is carried out with a specified polymerization catalyst, that a plurality of polymer resin having a different melt tension are mixed together, that polymerization reaction is carried out multi-stepwise to prepare a polymer resin consisting of components having a different melt tension and the obtained polymer resin is admixed and the like.

According to one embodiment of the present invention, polyethylene or a copolymer of ethylene and $\alpha$-olefin of $C_4$ to $C_{20}$ having 0.1 to 50 g/10 min. of melt index measured according to JIS K 6760, 0.910 to 0.940 g/cm$^3$ of a density and 110° to 130° C. of a melting point is preferably employed.

When the melt index is less than 0.1 g/10 min., it is difficult to prepare the pre-expanded particles because a flowability of the polymer is not good during a preparation of the pre-expanded particles. On the other hand, when the melt index is more than 50 g/10 min., a flowability of the polymer is very high, and the obtained pre-expanded particles have low pre-expansion ratio and tend to shrink.

When the density is less than 0.910 g/cm$^3$, the polymer resin is so soft that the obtained pre-expanded particles are apt to shrink. On the other hand, when the density is more than 0.940 g/cm$^3$, the polymer behaves like a high density polyethylene and a foaming procedure is difficult because of a reason described below.

When the melting point is less than 110° C., the pre-expanded particles have insufficient heat-resistance. On the other hand, when the melting point is more than 130° C., the polymer behaves like a high density polyethylene and a foaming is difficult.

Above-mentioned $\alpha$-olefin having 4 to 20 carbon atoms includes, for instance, 1-butene, 1-pentene, 1-hexene, 3,3-dimethyl-1-butene, 4-methyl-1-pentene, 4,4-dimethyl-1-pentene, 1-octene, 1-decene, 1-dodecene, 1-tetradecene, 1-octadecene and the like. The $\alpha$-olefin is employed alone or in admixture thereof.

A content of a comonomer is varied according to a kind of the used $\alpha$-olefin and is generally about 3 to about 12% by weight in the obtained copolymer so as to give a density of the copolymer in the range limited as above.

Above-mentioned melting point is a peak temperature of the endothermic curve obtained by raising a temperature of a polymer sample at a rate of 20° C./min. up to 200° C. to melt, cooling it at a rate of 20° C./min. down to room temperature to crystallize and then, re-heating it at a rate of 10° C./min. with a differential scanning calorimeter (DSC).

Ethylene polymer used in the present invention is preferable a non-crosslinked ethylene polymer. However, ethylene polymer crosslinked by an organic peroxide or electron beam irradiation can also be used without any disadvantage.

According to another embodiment of the present invention, the above-mentioned copolymer can contain one or more polyolefin such as high-pressure process, low density polyethylene, high density polyethylene, polypropyrene or ethylenepropyrene copolymer in an amount of less than 50% by weight as long as the effects of the present invention are not inhibited. Also, additives such as an ultraviolet stabilizer, an antistatic agent, a heat stabilizer, a fire retardant, a coloring agent and inorganic powders can be added into the olefin polymer as occasion demands.

A process for preparing the above-mentioned pre-expanded particles is a second aspect of the present invention.

In a pre-expanding process in which a mixture of water and polymer resin particles impregnated with a volatile foaming agent is released from a condition of high temperature and high pressure to an atmosphere of low pressure, a temperature of the polymer resin particles must be maintained in a small temperature range.

Therefore, a polymer having a small temperature range in which the polymer has a suitable viscoelastisity for pre-expansion, for instance, a high density polyethylene can be employed in contrast with a conventional process for pre-expanding the particles with steam. However, in a foaming process in which a mold is charged with pre-expanded particles and heated, when usually employed ethylene polymer such as a high-pressure process, low density polyethylene or a high density polyethylene is used, foaming procedure is difficult because the heating range to be applied during foaming is very small. The particles are not fused together in case that a heating temperature is low and the particles are shrinked in case that the heating temperature is high.

It was found that olefin polymer used in the present invention, especially polyethylene or a copolymer of ethylene and α-olefin of $C_4$ to $C_{20}$ having 0.1 to 50 g/10 min. of melt index, 0.910 to 0.940 g/cm$^3$ of a density and 110° to 130° C. of a melting point have a wide range of heating temperature to be applied during foaming, and that foaming procedure is easy to be carried out. Though the reason has not yet been confirmed, it is supposed to be the reason that a temperature range in which the pre-expanded particles are crystallized is wide as observed, for example, with DSC and that a temperature range in which the pre-expanded particles are expanded to a maximum extent in a mold is close to a temperature range in which the pre-expanded particles are fused together.

Contrary to that a conventional process has a drawback that the pre-expanded particles are stuck to each other, particularly when a mixture of the polyolefin particles and water is released into an atmosphere of low pressure through at least one orifice having a diameter of 1.2 to 3 times a diameter of a sphere calculated from the volume of the polyolefin particle, that problem is completely solved, i.e. all of the obtained pre-expanded particles are separated piece by piece.

The words "a diameter of a sphere calculated from the volume of the polyolefin particle" as used herein means a diameter of a sphere having the same volume as a volume of the polyolefin particle and hereinafter, it is referred to as "a sphere diameter".

When a diameter of the orifice is too small, the particles can not pass through the orifice. On the other hand, when a diameter of the orifice is too large, several particles are released simultaneously into an atmosphere of low pressure and thus, the particles are caused to be agglomerated and stuck to each other at a time that they pass through the orifice or that they expand thereafter, and blocking is occurred.

A shape of the orifice is generally a circle or an ellipse, but an orifice of a polygon can be employed, as occasion demands. An orifice size is determined from a diameter of the used polyolefin particle. Because a particle having a sphere diameter of about 0.5 to about 6 mm is generally used for a usual foaming within a mold, the orifice has an area of about 0.3 to about 250 mm$^2$. Consequently, a releasing speed is controlled by changing a number of the orifice. The orifice can be provided, for instance, by inserting a pressure-resistant orifice plate having at least one orifice behind a releasing valve with a flange.

With respect to the third problem, i.e. a defect that pre-expansion ratio of the pre-expanded particles are not uniform, particularly when a temperature and a pressure in a vehicle such as an autoclave, preferably and a partial pressure of the foaming agent in a gas phase in the vehicle are kept constant at a time of releasing the aqueous dispersion of the olefin polymer particles into an atmosphere of low pressure, that defect is clearly eliminated.

The temperature varies preferably within 5 degree centigrade during releasing the dispersion. The temperature can be easily controlled, for instance, by using a usually employed autoclave having a jacket.

The pressure in an autoclave falls down according as a mixture of particles and water is released because the upper space in an autoclave becomes large, thereby the pre-expansion ratio of the released particles was decreased. Thus, a pressure in an autoclave is preferably kept constant during releasing the aqueous dispersion of the particles.

When the releasing procedure is long continued, introducing nitrogen gas or air under pressure into an autoclave is not so effective to keep the pressure in an autoclave constant and thus, pre-expansion ratio of the pre-expanded particles are largely decreased. This is because a content of a foaming agent is lowered owing to a volatilization of the foaming agent from the particles in proportion to a partial pressure of the foaming agent in a gas phase in the autoclave falls down. Thus, more preferably a partial pressure of the foaming agent in a gas phase in the autoclave, as well as a total pressure in the autoclave, is kept constant during releasing operation. This is carried out, for example, by decreasing a volume of the upper space in the vehicle according as the space increases to keep a volume of the upper space constant, or by introducing a volatile foaming agent as well as nitrogen gas or air into the vehicle from outside according as the upper space increases. However, above-mentioned methods are effective only when the upper space in the vehicle is not saturated with a vapour of the foaming agent and a partial pressure of the foaming agent in the gas phase is decreased during releasing the dispersion. Consequently, when the upper space is saturated with the vapour of the foaming agent, for instance, when excess foaming agent is present as liquid in the vehicle, the introduction of the foaming agent is not necessary.

The latter method is prefer to the former method, because the former method requires more complicated process.

The latter method can be carried out, for instance, by introducing the liquid volatile foaming agent continuously or intermittently via a controlling valve with adjusting the introduced amount to keep a total pressure in the vehicle constant. Thus, the pre-expanded particles, pre-expansion ratio of which is nearly close to each other, can be obtained even when the releasing operation is long continued.

The words "to keep a pressure constant" described in the specification and Claims means to control and maintain a pressure in a pressure range in which the pre-expanded particles having pre-expansion ratio of allowable variation are obtained.

According to the present invention, various volatile foaming agents having a boiling point of −50° to 120° C. can be employed. Examples of such a foaming agent are, for instance, an aliphatic hydrocarbon such as propane, butane, pentane, hexane, heptane, cyclopentane or cyclohexane; a halogenated hydrocarbon such as monochloromethane, dichloromethane, monochloroethane, trichloromonofluoromethane, dichlorodifluoromethane, dichloromonofluoromethane, trichlorotrifluoroethane or dichlorotetrafluoroethane and the like. The foaming agent can be employed alone or in admixture thereof. A used amount of the volatile foaming agent is decided according to a kind thereof, a desired pre-expansion ratio of the obtained pre-expanded particle, a ratio of a volume of the polymer resin and a volume of the upper space in the vehicle. In general, the foaming agent is used in 5 to 50 parts by weight to 100 parts by weight of olefin polymer particles.

Dispersing agent is used in a little amount at a time of dispersing the polyolefin particles into water in the process of the present invention to inhibit a flocculation of the particles during heating. Examples of such a dispersing agent is, for example, a water-soluble polymer such as polyvinylalcohol, methylcellulose or N-polyvinylpyrrolidone; powders of a water-insoluble inorganic compound such as calcium phosphate, magnesium pyrophosphate, zinc carbonate, titanium oxide or aluminum oxide and the like. The water-insoluble inorganic compound is prefer to the water-soluble polymer because the latter has a problem of environmental polution. However, when the inorganic powders are used in much amount, pre-expanded particles are not well fused together at a time of foaming. So, a little amount of an anionic surfactant such as sodium alkylbenzenesulfonate including sodium dodecylbenzenesulfonate or the like, sodium α-olefinsulfonate or sodium alkylsulfonate is preferably used with the inorganic powders to decrease the used amount of the powders. In this case, the powders of a water-insoluble inorganic compound are used in 0.1 to 3 parts by weight and the anionic surfactant is used in 0.001 to 0.5 part by weight to 100 parts by weight of the polyolefin resin.

According to the present invention, aqueous dispersion of the polyolefin particles are heated into a temperature in a following range:
(a melting point of the polyolefin $-25$)° C.
to (a melting point of the polyolefin $+10$)° C.
preferably
(a melting point of the polyolefin $-20$)° C.
to (a melting point of the polyolefin $+5$)° C.
The temperature can be varied within the the above-mentioned temperature range according to a kind of used volatile foaming agent and a desired pre-expansion ratio. For example, as to an olefin polymer having a melting point of 120° C., heating temperature can be selected from a range of 95° to 125° C. When a heating temperature is less than the above-mentioned temperature range, an expansion ratio is largely decreased. On the other hand, when a heating temperature is more than the temperature range defined above, the cells in the obtained pre-expanded particles are collapsed.

The thus obtained pre-expanded particle of polyolefin of the present invention can be employed in a foaming process, for instance, a process that the obtained pre-expanded particles are, just as they are, or after aging or drying for a suitable time, or after giving them additional expansion ability, filled in a mold, and the pre-expanded particles are heated with a heating medium such as steam up to about 105° to about 130° C. for about 3 sec. to about 2 min. to give a molded article.

A method for further giving the pre-expanded particles additional expansion ability can be carried out, for instance, by introducing a gas such as nitrogen gas or air under pressure into the cells in the particles to elevate a pressure in the cells, or by pressing the pre-expanded particles with a compressed air to elevate a pressure in the cells. It is also effective to compress a mold charged with the pre-expanded particles made expansible or not before foaming.

The pre-expanded particles of polyolefin of the present invention can also be prepared by other conventional process.

The pre-expanded particles of polyolefin of the present invention are not stuck together at all and have uniform expansion ratio, and can be industrially employed for a conventional foaming process with ease because they have a wide range of heating temperature. The pre-expanded particles of the present invention can give a large size foamed article having a flat surface and a good mechanical strength. A foamed article produced from the pre-expanded particles of the present invention has an excellent appearance and a uniform density in which the pre-expanded particles are well fused together. The foamed article has a good cushoning property as similar to a conventional molded article of high-pressure process, low density crosslinked polyethylene, an excellent heat-resistance and a toughness, and are useful for wrapping material, insulating material, a container or a fender of cars.

The present invention is more particularly described and explained by means of the following Examples, in which all parts are parts by weight unless otherwise noted. It is to be understood that the present invention is not limited to the Examples and various changes and modifications may be made in the invention without departing from the spirit and scope thereof.

EXAMPLE 1

A 100 l autoclave equipped with a stirrer was charged with 100 parts (25 kg) of non-crosslinked, linear, low-density polyethylene (hereinafter, referred to as "L-LDPE") particles containing 0.01 part of talc, and having an inclination of melt tension of about 585, a melting point measured by DSC method of 117° C., a density of 0.920 g/cm$^3$, MI of 0.8 g/10 min. and a sphere diameter of 2 mm, 0.5 part of basic powdered calcium phosphate and 0.006 part of sodium dodecylbenzenesulfonate as dispersing agent and 300 parts of water. After stirring the mixture, to the dispersion thus obtained was added 45 parts of dichlorodifluoromethane with stirring and the temperature of the dispersion was raised to 112° C. A pressure in the autoclave at that time was 26 kg/cm$^2$·G.

By opening a releasing valve provided in a lower part of the autoclave, the aqueous dispersion of L-LDPE particles was released into an atmosphere of normal pressure through a round orifice having 4 mm in a diameter in an orifice plate provided behind the valve to give pre-expanded particles.

The obtained pre-expanded particles had an average pre-expansion ratio of 25 times and an average cell size of 230 μm. The results are summarized in Table 1.

The pre-expanded particles were dried at 60° C. for 24 hrs. and subjected to foaming within a mold using SC-10B foaming machine (commercially available from Toyo Kikai Kinzoku Kabushiki Kaisha) under a condition as shown in Table 2 to give a foamed article.

With respect to the obtained foamed article, characteristic properties shown in Table 3 were evaluated as described below.
Rate of shrinkage:
After aging, a foamed article was left at room temperature for 24 hrs. A real volume of the article was measured by doping it into water. The obtained real volume and a volume of the used mold were inserted into a following equation to give a volume of article.

Rate of shrinkage =

$$\frac{\text{A real volume of the foamed article}}{\text{A volume of the used mold cavity}} \times 100\ (\%)$$

Fusibility:

A foamed article was broken at several portions and appearance of the exposed surfaces were observed. A proportion of particles which were broken themselves not at their fused surfaces was counted.

◎ : The proportion is over 70%.
○ : The proportion is over 50%, less than 70%.
X: The proportion is over 30%, less than 50%.

Surface property:

A surface of the obtained foamed article was observed.

○ : The surface is almost smooth and flat.
Δ: Fused bounds are remarkable.
X: Fused bounds are very remarkable and an article is not commercially valuable.

Sink:

A molded article was judged from the result of a rate of shrinkage and a shrinkage in a dimension thereof.

◎ : Volume of article is over 90% and a shrinkage is less than 5%.
○ : Volume of article is over 90% and a shrinkage is 5% to 10%.
Δ: Volume of article is over 80%, less than 90%.
X: Volume of article is less than 80%.

Total judgement:

A molded article was judged from the result of surface property and sink.

◎ : Surface property and sink are both ◎ , or ○ and ○.
○ : Surface property and sink are both ○.
Δ: At least one of surface property and sink is Δ.
X: At least one of surface property and sink is X.

An inclination of melt tension of the used L-LDPE was obtained by measuring melt tension under a condition of a scan speed of 1.52 m/min., an air gap of 25 cm and an extruding speed of 0.25 g/min., at 180±0.4° C.,
200±0.4° C. and 220±0.4° C., respectively using a melt tension tester commercially available from Toyo Seiki Seisakusho, Ltd. The obtained graph is shown in FIG. 1.

EXAMPLES 2 to 3

The procedures of Example 1 were repeated except that L-LDPE having an inclination of melt tension of about 900 (Example 2) and L-LDPE having an inclination of melt tension of about 1,400 (Example 3) were employed instead of L-LDPE having an inclination of melt tension of about 585.

The characteristic properties of the obtained pre-expanded particles and the foamed article are summarized in Table 1 and Table 3, respectively.

COMPARATIVE EXAMPLES 1 and 2

The procedures of Example 1 were repeated except that L-LDPE having an inclination of melt tension of about 1,700 and non-crosslinked low density polyethylene (hereinafter, referred to as "LDPE") having an inclination of melt tension of about 3,000 were employed instead of L-LDPE having an inclination of melt tension of about 585.

The characteristic properties of the obtained pre-expanded particles and the foamed article are summarized in Table 1 and Table 3, respectively.

TABLE 1

| | Components of the olefin polymer particle | | | Characteristic properties of the olefin polymer | | |
|---|---|---|---|---|---|---|
| | Kind of olefin polymer | Content of olefin polymer (parts) | Content of talc (part) | MI (g/10 min) | Density (g/cm³) | Melting point* (°C.) |
| Ex. 1 | L-LDPE | 99.99 | 0.01 | 0.8 | 0.920 | 117 |
| Ex. 2 | L-LDPE | 99.99 | 0.01 | 1.0 | 0.920 | 119 |
| Ex. 3 | L-LDPE | 99.99 | 0.01 | 1.0 | 0.920 | 120 |
| Com. Ex. 1 | L-LDPE | 99.99 | 0.01 | 2.1 | 0.920 | 122 |
| Com. Ex. 2 | LDPE | 99.99 | 0.01 | 1.3 | 0.924 | 109 |

| | Preparation condition | | | Characteristic properties of the obtained pre-expanded particle | | |
|---|---|---|---|---|---|---|
| | Temperature in the autoclave (°C.) | Pressure in the autoclave (kg/cm² · G) | Content of dichlorodi-fluoromethane (parts) | Pre-expansion ratio** | Diameter of cells (μm) | Inclination of melt tension |
| Ex. 1 | 112 | 26 | 45 | 24 to 26 | 150 to 300 | 585 |
| Ex. 2 | 115 | 28 | 45 | 24 to 26 | 100 to 200 | 900 |
| Ex. 3 | 116 | 27 | 43 | 23 to 26 | 100 to 200 | 1,400 |
| Com. Ex. 1 | 118 | 27 | 45 | 24 to 26 | 50 to 150 | 1,700 |
| Com. Ex. 2 | 103 | 23 | 45 | 29 to 31 | 150 to 300 | 3,000 |

*measured according to DSC method
**calculated by doping the pre-expanded particles into water

TABLE 2

| | | | Foaming condition | | |
|---|---|---|---|---|---|
| | Experimental No. | Mold size | Addition of internal pressure of pre-expanded particle | Pressure of steam (kg/cm² · G) | Aging (°C. × time) |
| Ex. 1 | 1 | S | No | 1.1 | 80 × 8 |
| | 2 | S | Yes | 1.2 | 60 × 12 |
| | 3 | L | No | 1.1 | 80 × 8 |
| | 4 | L | No | 1.7 | 80 × 8 |
| | 5 | L | Yes | 1.2 | 60 × 12 |
| | 6 | L | Yes | 1.8 | 60 × 12 |
| Ex. 2 | 7 | S | No | 1.1 | 80 × 8 |
| | 8 | S | Yes | 1.2 | 60 × 12 |
| | 9 | L | No | 1.1 | 80 × 8 |
| | 10 | L | No | 1.7 | 80 × 8 |
| | 11 | L | Yes | 1.2 | 60 × 12 |

TABLE 2-continued

| | | Foaming condition | | |
|---|---|---|---|---|
| Experimental No. | Mold size | Addition of internal pressure of pre-expanded particle | Pressure of steam (kg/cm² · G) | Aging (°C. × time) |
| | 12 | L | Yes | 1.8 | 60 × 12 |
| Ex. 3 | 13 | S | No | 1.1 | 80 × 8 |
| | 14 | S | Yes | 1.2 | 60 × 12 |
| | 15 | L | No | 1.1 | 80 × 8 |
| | 16 | L | No | 1.7 | 80 × 8 |
| | 17 | L | Yes | 1.2 | 60 × 12 |
| | 18 | L | Yes | 1.8 | 60 × 12 |
| Com. Ex. 1 | 19 | S | No | 1.1 | 80 × 8 |
| | 20 | S | Yes | 1.2 | 60 × 12 |
| | 21 | L | No | 1.1 | 80 × 8 |
| | 22 | L | No | 1.7 | 80 × 8 |
| | 23 | L | Yes | 1.2 | 60 × 12 |
| | 24 | L | Yes | 1.8 | 60 × 12 |
| Com. Ex. 1 | 25 | S | Yes | 0.2 | 60 × 12 |
| | 26 | S | Yes | 0.4 | 60 × 12 |
| | 27 | S | Yes | 0.7 | 60 × 12 |

TABLE 3

| | | Characteristic properties of foamed article | | | |
|---|---|---|---|---|---|
| | Experimental No. | Rate of shrinkage (%) | Fusibility | Surface property | Sink | Total judgement |
| Ex. 1 | 1 | 90 | ⊚ | ○ | ⊚ | ⊚ |
| | 2 | 94 | ⊚ | ○ | ⊚ | ⊚ |
| | 3 | 90 | ⊚ | ○ | ⊚ | ⊚ |
| | 4 | 90 | ⊚ | ○ | ⊚ | ⊚ |
| | 5 | 93 | ⊚ | ○ | ⊚ | ⊚ |
| | 6 | 91 | ⊚ | ○ | ⊚ | ⊚ |
| Ex. 2 | 7 | 91 | ⊚ | ○ | ⊚ | ⊚ |
| | 8 | 94 | ⊚ | ○ | ⊚ | ⊚ |
| | 9 | 91 | ⊚ | ○ | ⊚ | ⊚ |
| | 10 | 90 | ⊚ | ○ | ⊚ | ⊚ |
| | 11 | 94 | ⊚ | ○ | ⊚ | ⊚ |
| | 12 | 93 | ⊚ | ○ | ⊚ | ⊚ |
| Ex. 3 | 13 | 91 | ○ | ○ | ⊚ | ⊚ |
| | 14 | 91 | ○ | ○ | ⊚ | ⊚ |
| | 15 | 90 | ⊚ | ○ | ⊚ | ⊚ |
| | 16 | 90 | ⊚ | ○ | ⊚ | ⊚ |
| | 17 | 93 | ⊚ | ○ | ⊚ | ⊚ |
| | 18 | 92 | ⊚ | ○ | ⊚ | ⊚ |
| Com. Ex. 1 | 19 | 91 | ○ | ○ | ○ | ○ |
| | 20 | 94 | ○ | ○ | ○ | ○ |
| | 21 | 80 | X | △ | △ | △ |
| | 22 | 85 | ○ | ○ | △ | △ |
| | 23 | 80 | X | △ | △ | △ |
| | 24 | 85 | ○ | ○ | △ | △ |
| Com. Ex. 2 | 25 | Almost all the pre-expanded particles were remained. | X | X | X | X |
| | 26 | | X | X | X | X |
| | 27 | | X | X | X | X |

With respect to Comparative Example 2, as seen in Table 1, a pressure in the autoclave is lower because a melting point of used LDPE is low and the pre-expanded particles are shrinked when steam of 0.7 kg/cm²·G is employed.

In Table 2, with respect to a mold size, S represents a single cavity mold of 200 mm × 200 mm × 50 mm in cube, and L represents a single cavity mold of 400 mm × 900 mm × 50 mm in cube. In Table 2, with respect to addition of internal pressure of pre-exapanded particle, Yes represents that the pre-expanded particles were subjected to a compressing treatment by air before foaming under a condition of 60° C. and 10 kg/cm²·G for 1 to 2 hrs. to give an internal pressure of the pre-expanded particle of 1.4 to 1.8 atm., and No represents that the pre-expanded particles were not subjected to such a compressing treatment, i.e. an internal pressure of the pre-expanded particle before foaming was atmospheric pressure.

As shown in Table 1, pre-expanded particles of Example 1 to 3 have similar characteristic properties without being so influenced by an inclination of melt tension, because a control of heating is precisely realized during a preparation of the pre-expanded particles.

As clearly understood from Tables 2 and 3, when the pre-expanded particles having an inclination of melt tension less than 1,400 are employed for foaming within a mold, a foaming condition, a restriction of which is relaxed, can be employed and foamed articles can be constantly obtained.

On the other hand, when the pre-expanded particles having an inclination of melt tension is over 1,700 are employed, though a small foamed article is obtained, a large size of foamed article having a good appearance, in which the pre-expanded particles are well fused together, cannot be obtained.

EXAMPLE 4

A 1000 l autoclave equipped with a stirrer was charged with 100 parts (225 kg) of particles of a copolymer of ethylene and 4-methyl-1-pentene having a melting point of 120° C., a density of 0.920 g/cm³, MI of 2.1 g/10 min. and a sphere diameter of about 2 mm, 0.5 part of basic powdered calcium phosphate and 0.006 part of sodium dodecylbenzenesulfonate as dispersing agent and 300 parts of water. After stirring the mixture, to the dispersion thus obtained was added 30 parts of dichlorodifluoromethane with stirring, and the temperature of the dispersion was raised to 117° C. A pressure in the autoclave at that time was 27 kg/cm²·G.

By opening a releasing valve provided at a lower part of the autoclave, the aqueous dispersion of the copolymer particles was released into an atmosphere of normal pressure through a round orifice having 4 mm in a diameter in an orifice plate provided behind the valve to give pre-expanded particles. The releasing operation was carried out for half an hour while a pressure in the autoclave was kept constant at 27 kg/cm²·G by introducing liquefied dichlorodifluoromethane under pressure into the autoclave with controlling the introduced amount through an injection valve.

The obtained pre-expanded particles were not stuck to each other and have average pre-expansion ratio of 26.7. Almost all the pre-expansion ratio were in a range of 24 to 28. Decrease of the pre-expansion ratio was not observed during the latter half of the releasing operation and the pre-expansion ratio of the obtained pre-expanded particles were all nearly close to each other.

After drying the pre-expanded particles at 60° C. for 24 hrs., the particles were pressed with compressed air of 60° C. and 20 kg/cm²·G for 2 hrs. to immerse air into the cells of the pre-expanded particles. A mold of 290 mm × 270 mm × 50 mm was charged with thus treated particles and the mold was heated with steam of 1.5 kg/cm²·G for 15 sec. to give a foamed article. The obtained foamed article was an excellent article having a flat surface and a density of 0.024 g/cm³, in which the pre-expanded particles were well fused together.

Characteristic properties of the foamed article and a molded article of high-pressure process, low density, crosslinked polyethylene (commercially available from Kanegafuchi Kagaku Kogyo Kabushiki Kaisha under a commercial name of "EPERAN") are shown in Table 4.

As clearly understood from Table 4, a foamed article having 38 of expansion ratio of the present invention has a solidity and a cushoning property of the same rank as a molded article of crosslinked polyethylene having 27 of expansion ratio.

TABLE 4

|  | A foamed article of Example 4 | A molded article of crosslinked polyethylene |
| --- | --- | --- |
| Density (g/cm$^3$) | 0.024 | 0.034 |
| Expansion-ratio | 38 | 27 |
| Solidity (kg/cm$^2$)* | 0.7 | 0.7 |
| Minimum static cushoning coefficient (C min) | 3.4 | 3.6 |

*measured according to JIS K 6767

COMPARATIVE EXAMPLE 3

In a 4 l autoclave equipped with a stirrer 100 parts (900 g) of high-pressure process, low density polyethylene particles having particle size of about 2 mm (Experimental No. 1) or high density polyethylene particles having particle size of about 2 mm (Experimental No. 2) shown in Table 5, 0.5 part of basic powdered calcium phosphate and 0.006 part of sodium dodecylbenzenesulfonate as a dispersing agent were dispersed into 300 parts of water.

After 30 parts of dichlorodifluoromethane was added to the obtained dispersion with stirring, the temperature of the dispersion was raised to the temperature shown in Table 5. While maintaining a pressure in the autoclave at that time by introducing nitrogen gas under pressure into the autoclave, the aqueous dispersion was released into an atmosphere of normal pressure through a round orifice having 4 mm in diameter provided in an orifice plate.

The pre-expansion ratio of thus obtained pre-expanded particles of the low density polyethylene and the high density polyethylene were shown in Table 5.

The foaming procedure of Example 4 was repeated except that the obtained low density and high density polyethylene particles were used. As a result, good foamed articles could not be produced as shown in Table 5.

TABLE 5

|  | High-pressure process, low density polyethylene | High density polyethylene |
| --- | --- | --- |
| Melting point (°C.) | 109 | 131 |
| Density (g/cm$^3$) | 0.922 | 0.950 |
| MI (g/10 min) | 1.5 | 2.5 |
| Heating temperature (°C.) | 103 | 125 |
| Pressure in the autoclave (kg/cm$^2$ · G) | 22.5 | 26.2 |
| Pre-expansion ratio | 30.0 | 26.1 |
| Molding property | Any foamed article could not be | |

TABLE 5-continued

|  | High-pressure process, low density polyethylene | High density polyethylene |
| --- | --- | --- |
|  | produced, since the packed pre-expanded particles were immediately shrinked when the particles were heated with steam. | |

COMPARATIVE EXAMPLE 4

The procedure of Example 4 was repeated except that the aqueous dispersion was released through a releasing valve having 25 mm in inner diameter instead of the orifice.

The obtained pre-expanded particles included many agglomerated particles which had 2 to 20 pre-expanded particles stuck to each other. Those pre-expanded particles could not be used for the further molding process.

COMPARATIVE EXAMPLE 5

The procedure of Example 4 was repeated except that, at the time of releasing the dispersion, compressed nitrogen gas was introduced instead of liquefied dichlorodifluoromethane. As a result, the pre-expansion ratio of the obtained pre-expanded particles was changed from 26.7 to 15.3 during the releasing procedure, i.e. 30 mins.

EXAMPLE 5

The procedure of Comparative Example 3 was repeated except that the copolymer particles of ethylene and the monomers as shown in Table 6 having a sphere diameter of about 2 mm to produce foamed articles. The obtained foamed articles were not shrinked at all and had an excellent molding property, i.e. the pre-expanded partices were completely fused together. The results are shown in Table 6.

TABLE 6

|  | Experimental No. | | | |
| --- | --- | --- | --- | --- |
|  | 1 | 2 | 3 | 4 |
| Comonomer | 4-methyl-1-pentene | 4-methyl-1-pentene | 1-butene | 1-butene |
| Melting point(°C.) | 122 | 123 | 120 | 122 |
| Density (g/cm$^3$) | 0.930 | 0.935 | 0.922 | 0.930 |
| MI (g/10 min) | 2.1 | 2.1 | 0.6 | 0.6 |
| Heating temperature (°C.) | 118 | 119 | 117 | 120 |
| Pressure in the autoclave (kg/cm$^2$ · G) | 28 | 30 | 27 | 27 |
| Pre-expansion ratio | 26.1 | 20.4 | 26.7 | 22.3 |

What we claim is:

1. A pre-expanded particle of non-crosslinked linear low density ethylene polymer which is a copolymer of ethylene and an α-olefin of $C_4$ to $C_{20}$ having a melt index of 0.1 to 50 g/10 min., a density of 0.910 to 0.940 g/cm$^3$ and a melting point of 110° to 130° C.

2. The pre-expanded particle of claim 1, wherein the non-crosslinked linear low density ethylene polymer has an inclination of melt tension of less than 1,500.

3. The pre-expanded particle of claim 1, wherein the non-crosslinked linear low density ethylene polymer contains about 3 to about 12% by weight of the α-olefin.

* * * * *